March 10, 1931. P. M. NAGY 1,796,044
SWIVEL CASTER
Filed Feb. 11, 1930
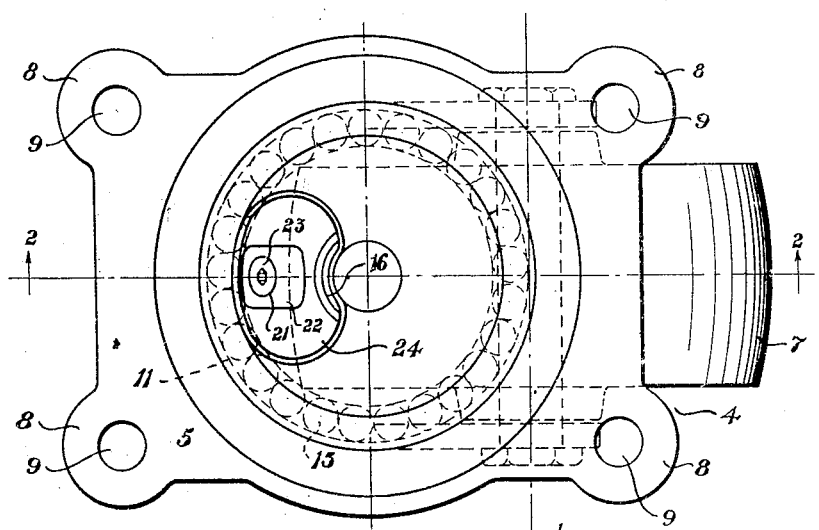
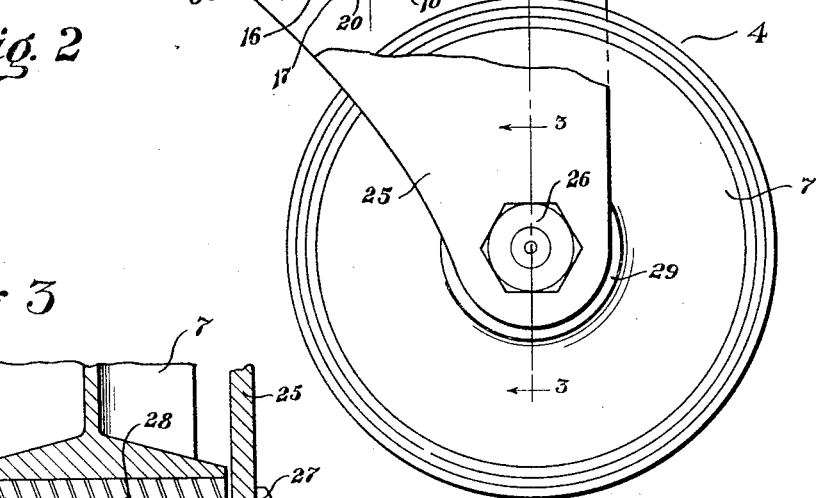
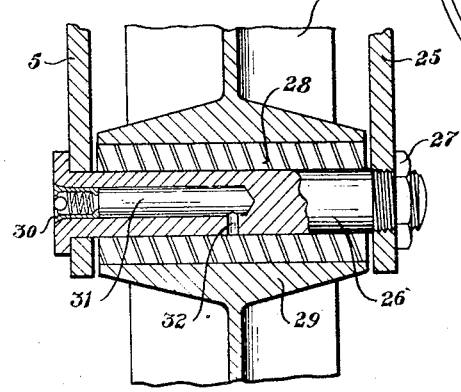
Inventor
Peter M. Nagy
By Freas and Bishop
Attorneys Patented Mar. 10, 1931

1,796,044

UNITED STATES PATENT OFFICE

PETER M. NAGY, OF ALLIANCE, OHIO, ASSIGNOR, BY MESNE ASSIGNMENTS, TO TRANSUE AND WILLIAMS STEEL FORGING CORPORATION, OF ALLIANCE, OHIO, A CORPORATION OF DELAWARE

SWIVEL CASTER

Application filed February 11, 1930. Serial No. 427,521.

The invention relates to ball bearing swivel casters more particularly of the heavy type used for industrial trucks, warehouse trucks or storage bins, and for portable safes, cabinets and the like. However, the improved caster may be of a smaller size to be used upon office and household furniture, desks, chairs and the like.

Swivel casters have been made including a plurality of sets of annular ball bearings for journalling the caster wheel mounting to resist radial and thrust loading, in which one set of balls lock the wheel mounting member to the caster base plate member. However, these prior types of casters do not provide means for equally distributing the load to all of the bearing balls.

One of the objects of the present invention is therefore to provide a swivel caster having an annular ball bearing for resisting both radial and thrust loading in which the bearing balls hold the caster wheel mounting frame member in assembled relationship with the base plate member, and in which means is provided for equally distributing the loading to the bearing balls.

Another object of the invention is to provide a caster in which the component parts may be fabricated by drop forging the same.

Moreover, further objects of the invention are to provide a caster which may be adjusted for wear, to provide a caster which may be readily and quickly lubricated, and to provide a caster which has a very simplified design and consequent low cost of production, a free swivelling movement when subjected to heavy loading, and great strength for resisting shocks and strains.

These and other objects may be attained by providing a construction, a preferred embodiment of which is hereinafter set forth in detail, which may be stated in general terms as including a base plate member having a ball seat and an annular ball raceway, a caster wheel mounting frame member having an adjustable ball seat and an annular raceway, a ball located between the ball seats, an annular series of balls located in the annular raceways holding the members in assembled relationship, means for introducing the balls into the ball bearing annulus, a caster wheel, roller means mounting the caster wheel on the wheel mounting frame, and means for lubricating the caster wheel and the ball bearings.

A preferred embodiment of the invention is shown in the accompanying drawings, in which—

Figure 1 is a top plan view of the improved caster;

Fig. 2 is a section of the improved caster taken on the line 2—2, Fig. 1 and showing the caster wheel in full; and Fig. 3 is a section taken on the line 3—3, Fig. 2 showing the caster wheel mounting.

Similar numerals refer to corresponding parts throughout the several figures of the drawings.

The improved caster is illustrated generally at 4 and may include a base plate member 5, a caster wheel mounting frame member 6 and a caster wheel 7.

The base plate 5 is substantially rectangular in form and has corner ears 8, provided with apertures 9, through which bolts or the like may pass for securing the caster to the bottom of a truck, bin, safe or cabinet for providing a caster swivel therefor.

An annular flange 10 projects downwardly from the base plate 5 and is provided with an annular ball raceway 11. The central under surface of the base plate 5 is provided with a ball seat 12 which is spherical in contour. The annular raceway 11 and the spherical seat 12 have a common vertical axis indicated at $a$ in Fig. 2.

The swivel frame 6 has an upwardly projecting annular flange 13, which is provided with an annular ball raceway 14, and the frame is mounted for rotation about the vertical axis $a$ and held in assembled relationship with the base plate 8 by an annular series of balls 15 located in the annular raceways 11 and 14.

The mounting frame 6 is provided with a central screw threaded passage 16 in which is located the screw threaded member 17, having a ball seat 18 located on the vertical axis $a$, provided in its upper surface, which has a spherical contour corresponding to the contour of the spherical seat 12.

A single ball bearing 19 is located between the base plate 5 and mounting frame 6 and is seated in the spherical seats 12 and 18. These seats preferably have a greater radius than the radius of the spherical ball 19 for permitting relative axial adjustment between the seats 13 and 18 along the axis $a$ to compensate for wear of the various parts. This adjustment may be accomplished by inserting a preferably hexagon headed wrench into the hexagon shaped recess 20 in the member 17 for screwing the member 17 toward or away from the ball 19.

It is pointed out that the horizontal axis $b$ of the ball 19 is located above and considerably offset from the horizontal axis $c$ of the annular series of ball bearings 15 for a reason which will be hereinafter described.

The base plate member and mounting frame member may be assembled together by locating the flange 13 within the flange 10 and then introducing the balls 15 into the coacting raceways 11 and 14 through the passage 21 provided in the thickened boss 22 located in the upper surface of the mounting frame 6.

After a sufficient number of balls 15 have been introduced into the raceway to fill the same, a plug screw 23 is inserted into the threaded opening 21 for closing the same. It will be seen that the balls 15 hold the base plate and mounting frame together in assembled relationship and that the opening 24 provided in the base plate 5 permits the balls 15 to be introduced to the raceway through the passage 21, and permits the plug 23 to be later screwed into the passage 21.

The single ball 19 is then inserted through the passage 16 in the mounting frame and is held in place by inserting the member 17 within the passage 16 to the position shown in Fig. 2 of the drawings.

The mounting frame 6 is provided with two downwardly disposed forked legs 25 for mounting the caster wheel 7, and the caster wheel mounting may include a bolt axle shaft 26 provided with a nut 27 for locking the same to the forked legs 25. The caster wheel 7 may be journalled on the axle shaft 26 by providing the helical roller bearings 28 between the hub 29 of the wheel 7 and the shaft 26.

The roller bearings 28 may be lubricated by introducing a lubricant through the cup 30, press fitted in the outer end of the longitudinal bore 31, provided in the axial shaft 26, and the bore 31 communicates with the roller bearings 28 by means of a radial passageway 32.

The ball bearings 15 may be lubricated through the cup 33 provided in an aperture 34, located in the annular flange 10 of the base plate 5 and communicating at 35 with the raceway 11. Sufficient lubricant will find its way from the raceway 11 and 14 to the ball bearing 19 for lubricating the same.

It is pointed out that a vertical plane $d$ passing through the axis of the axle shaft 26 as shown in Fig. 2, does not intersect the annulus of the ball bearings 15, but is tangential thereto. With the various axes $a$, $b$, $c$, and $d$ located substantially as shown in the drawings, and with the member 17 substantially tightly fitted against the ball 19, a force applied upward along the vertical plane $d$ acts about a point which is at the center of the ball 19, causing a large upward thrust on the ball bearings 15 adjacent the plane $d$, and a large downward thrust on the ball bearings at a point directly opposite, while the intermediate balls 15 will have thrusts applied thereto varying from one extreme to the other.

I claim:

1. A caster having a base plate member, a frame member, an annular flange on each of the members, raceways provided on the flanges, an annular series of balls in said raceways providing a bearing between said members, said balls holding the members in assembled relationship, a spherical ball seat on each of the members, a single ball bearing interposed between the ball seats, and a wheel journaled in the frame member.

2. A caster having a base plate member, a frame member, an annular flange on each of the members, raceways provided on the flanges, an annular series of balls in said raceways providing a bearing between said members, said balls holding the members in assembled relationship, a spherical ball seat on each of the members, means for adjusting one of the ball seats relative to the other, a single ball bearing interposed between the ball seats, and a wheel journaled in the frame member.

3. A caster having a base plate member, a frame member, an annular flange on each of the members, raceways provided on the flanges, an annular series of balls in said raceways providing a bearing between said members, said balls holding the members in assembled relationship, a spherical ball seat on each of the members, a single ball bearing interposed between the ball seats, the annulus of the ball bearings having a vertical axis in common with the vertical axis of the single ball and spherical ball seats, a horizontal plane through the center of the single ball being offset from the horizontal plane of said annulus, and a wheel journaled in the frame member.

4. A caster having a base plate member, a frame member, an annular flange on each of the members, raceways provided on the flanges, an annular series of balls in said raceways providing a bearing between said members, said balls holding the members in assembled relationship, a spherical ball seat on each of the members, a single ball bearing interposed between the ball seats, a wheel having an axle carried by the frame out of center thereof, and a vertical plane passing through the axis of the wheel axle being tangential to the outer surface of the ball bearing annulus.

5. A caster having a base plate member, a frame member, an annular flange on each of the members, raceways provided on the flanges, an annular series of balls in said raceways providing a bearing between said members, said balls holding the members in assembled relationship, a spherical ball seat on each of the members, a single ball bearing interposed between the ball seats, a wheel journaled in the frame member, and means for lubricating the bearings and for lubricating the wheel.

6. A caster having a base plate member, a frame member, an annular flange on each of the members, raceways provided on the flanges, an annular series of balls in said raceways providing a bearing between said members, said balls holding the members in assembled relationship, a spherical ball seat in the lower surface of the base plate, there being a threaded passage through the frame member, a screw threaded member located in the passage having a spherical ball seat in its upper surface, means in said last mentioned member for receiving a tool for rotating the same to relatively adjust its spherical ball seat toward or away from the base plate spherical ball seat, a single ball bearing interposed between the ball seats, and a wheel journaled in the frame member.

7. A caster having a base plate member, a frame member, an annular flange on each of the members, raceways provided on the flanges, an annular series of balls in said raceways providing a bearing between said members, said balls holding the members in assembled relationship, there being an opening through the base plate member, there being a passage in said frame member communicating with its annular raceway adapted to be located below said opening for the introduction of said balls to said raceway, a closure for said passage, spherical ball seats on each of the members, a single ball bearing interposed between the ball seats, and a wheel journaled in the frame member.

In testimony that I claim the above I have hereunto subscribed my name.

PETER M. NAGY.